Patented Apr. 23, 1940

2,198,042

UNITED STATES PATENT OFFICE 2,198,042

POROUS METAL BODIES

Leo Schlecht, Ludwigshafen-on-the-Rhine, and Karl Ackermann, Mannheim, Germany, assignors to I. G. Farbenindustrie Aktiengesellschaft, Frankfort-on-the-Main, Germany No Drawing. Application June 13, 1938, Serial No. 213,422. In Germany June 17, 1937

4 Claims. (Cl. 75—22)

The present invention relates to improvements in the production of porous metal bodies.

Porous metal bodies may be prepared by sintering together metal powders. In order to obtain bodies having a large pore volume, it has been proposed to add to the metal powders substances which volatilize during the heating or which can be dissolved out from the sintered body after the heating. For the same purpose it has also been proposed to carry out the sintering only for a relatively short time and at not too high a temperature, for example at about 600° C. It is true that these methods lead to highly porous bodies, but the mechanical strength of the bodies often leaves much to be desired. Highly porous and at the same time very strong metal bodies may be prepared according to another known method by presintering the metal powders at a relatively low temperature, preferably below 700° C., and then subjecting them to one or more sinterings at higher temperatures, advantageously between 800° and 1200° C.

We have now found that when preparing porous bodies from powders of metals belonging to the iron group, working in stages in the said manner is unnecessary and that very strong, highly porous metal bodies can be obtained directly in a single sintering by using metal powders the pouring weight of which amounts to less than 2.0 kilograms per litre and carrying out the sintering of this powder at temperatures above 650° C. Generally speaking metal powders are chosen which have a shaking-weight considerably below 2.0 kilograms, advantageously in the region of from 0.5 to 1 kilogram per litre. With such light metal powders, sintering temperatures of about 1000° C. may be used, whereby the particles usually frit together so strongly, with simultaneous recrystallization, that very tenacious sinter bodies are obtained without the considerable diminution in the pore volume, otherwise observed, occurring to any appreciable extent.

Metal powders having the said low pouring weight can be obtained for example by reducing precipitated or fused metal oxides, preferably in the form of pieces, at low temperatures with gases and then comminuting the reduction product. It is specially advantageous to use metal powders which have been obtained by thermal decomposition or by reduction of volatile metal compounds, in particular metal carbonyls or metal chlorides.

The highly porous shaped metal articles may be used with special advantage for filtering purposes, as catalysts and, when they are prepared from iron or nickel, in particular as electrodes for secondary elements with alkaline electrolytes.

The following example will further illustrate the nature of this invention but the invention is not restricted to this example.

Example

Nickel powder (obtained by thermal decomposition of nickel carbonyl vapor in a heated free space and having a pouring weight of 0.9 kilogram per litre) is charged into a flat rectangular mould and then heated for 8 hours at 1000° C. in an atmosphere of hydrogen. The sinter plate thus obtained has a pore volume of about 85 per cent. When struck it makes a loud metallic sound. Compared with a plate which has been prepared from a nickel powder having a pouring weight of 3 kilograms per litre, its resistance to fracture is relatively very great, when considering its high pore volume.

By pressing a rim and a current terminal onto the plate and then introducing nickel hydroxide into the pores of the nickel sinter plate, there is obtained an accumulator electrode the capacity of which is about 1½ times as great as that of the known tubular electrodes for alkaline accumulators.

What we claim is:

1. In the process of producing porous metal bodies by sintering powders consisting of metals belonging to the iron group, using metal powders the pouring weight of which amounts to less than 2.0 kilograms per litre and carrying out the sintering at temperatures above 650° C.

2. In the process of producing porous metal bodies by sintering powders consisting of metals belonging to the iron group and obtained by thermal decomposition of their carbonyl compounds using metal powders the pouring weight of which amounts to less than 2.0 kilograms per liter and carrying out the sintering at temperatures above 650° C.

3. In the process of producing porous metal bodies by sintering powders consisting of metals belonging to the iron group using metal powders the pouring weight of which amounts to from 0.5 to 1 kilogram per litre and carrying out the sintering at temperatures above 650° C.

4. Porous metal bodies having high pore volume and great mechanical strength, prepared in accordance with the process as claimed in claim 1.

LEO SCHLECHT.
KARL ACKERMANN.